United States Patent
He

(10) Patent No.: US 9,033,586 B2
(45) Date of Patent: May 19, 2015

(54) TWO PIECE CAGE FOR A NEEDLE BEARING

(71) Applicant: Schaeffler Technologies GmbH & Co. KG, Herzogenaurach (DE)

(72) Inventor: Simon Xunnan He, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/446,885

(22) Filed: Jul. 30, 2014

(65) Prior Publication Data

US 2015/0049977 A1 Feb. 19, 2015

Related U.S. Application Data

(60) Provisional application No. 61/865,204, filed on Aug. 13, 2013.

(51) Int. Cl.
| | |
|---|---|
| *F16C 33/46* | (2006.01) |
| *F16C 33/51* | (2006.01) |
| *F16C 33/54* | (2006.01) |
| *F16C 19/46* | (2006.01) |

(52) U.S. Cl.
CPC .......... *F16C 33/4694* (2013.01); *F16C 33/547* (2013.01); *F16C 19/463* (2013.01)

(58) Field of Classification Search
CPC ............................. F16C 33/51; F16C 33/542
USPC .................... 384/572, 573, 577, 578
See application file for complete search history.

(56) References Cited

U.S. PATENT DOCUMENTS

| | | | |
|---|---|---|---|
| 4,004,840 A | 1/1977 | Johnston et al. | |
| 5,154,401 A | 10/1992 | Schramm et al. | |
| 6,179,474 B1 * | 1/2001 | Podhajecki | 384/573 |
| 6,247,847 B1 | 6/2001 | Lob | |
| 6,742,935 B2 * | 6/2004 | Saji | 384/587 |
| 6,776,532 B2 * | 8/2004 | Mochizuki | 384/572 |
| 6,855,080 B2 * | 2/2005 | Kanehira et al. | 474/231 |
| 7,891,880 B2 * | 2/2011 | Hofmann et al. | 384/568 |

* cited by examiner

*Primary Examiner* — Phillip A Johnson
(74) *Attorney, Agent, or Firm* — Antun M. Peakovic

(57) ABSTRACT

A two piece rolling element cage for a bearing assembly comprising a first and second cage, with axial projections extending from a cage body, oriented toward each other and inserted between rolling elements, on opposite axial ends of the rolling elements.

13 Claims, 5 Drawing Sheets

US 9,033,586 B2

TWO PIECE CAGE FOR A NEEDLE BEARING

TECHNICAL FIELD

Example aspects described herein relate to bearing assemblies, particularly of bearing rolling element guides or cages.

BACKGROUND

Bearing assemblies are typically circular in shape, and generally comprise rolling elements disposed between raceways in bearing rings. Rolling elements take many forms, including spherical balls, rollers or various other configurations, such as cone-shaped tapered rollers or barrel-shaped spherical rollers. Bearing rolling element guides, or cages, retain rolling elements within a bearing assembly, while typically allowing for free rotation of the rolling elements within the cages, and rotation of the cages within the bearing assembly. Cages can be used to separate rolling elements from each other, generally at equal intervals, and hold rolling elements in alignment with respect to the bearing rings. Depending on the structure of the bearing, or the bearing design, cages may be linear or circular and made from a variety of materials, including, but, not limited to brass, steel, and various types of plastic.

Broadly, there are two main types of bearing cages for so-called conrad or deep groove design bearings; "crown" or "snap" cages; and "ribbon" or "riveted" cages. The "snap" type has an annular side member and axial partitions projecting from said member. These partitions are typically parallel to each other and have open rolling element pockets, allowing said rolling elements to seat or "snap" into position within these open pockets. The "riveted" type is comprised of two pieces or halves, each half with an open pocket to accommodate a rolling element. The halves are assembled on opposite sides of the rolling element, the pockets surrounding the rolling elements, and contact at land surfaces at intervals between rolling elements, then are joined together at the mating surface using various types of fastening elements, such as rivets.

Cages are guided by one of the available surfaces between the inner and outer rings. Cages may be guided by the inner land or surface, wherein, the cage's bore slides, or is guided by, the outer diameter of the inner ring. They may also be guided by the outer land, wherein, the cage's bore slides, or is guided by, the inner diameter of the outer ring. Finally, cage's may touch neither ring, and be guided by the rolling elements themselves.

Some example bearing cages are shown in U.S. Pat. Nos. 6,247,847, 5,154,401 and 4,004,840.

Different types and sizes of bearings require specifically designed bearing cages, taking into account bearing assembly size, operating conditions, and rolling element size, among other factors. It is understood that a particular design of bearing may incorporate a type of cage, but, may require variations in the cage to accommodate the specific bearing, for example choice of rolling element or material used. In some applications, such as in valvetrains of internal combustion engines, needle roller bearings can be used that utilize no cages, with adjacent rolling elements contacting each other along a length thereof. This may be due to space constraints within such applications, for example, in roller finger followers or hydraulic lifters, that limit the assembly volume for such features. As a result, during operation, needles in the unloaded zone can scratch each other and may stop rolling, while, in the loaded zone, needles may slide, rather than roll, causing smearing damage on the inner raceway of the bearing. A cage design for such space constrained applications is needed.

SUMMARY OF THE INVENTION

A new design for a bearing cage is disclosed. In one example embodiment of the invention, the cage comprises two pieces on opposite axial ends of a bearing, providing separation and free rotation of the rolling elements.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. Radially inward directions are from an outer radial surface of the cage, toward the central axis or radial center of the cage. Conversely, a radial outward direction indicates the direction from the central axis or radial center of the cage toward the outer surface. Axially refers to directions along a diametric central axis. "Cage" and "rolling element guides" are used interchangeably.

Figure 1:
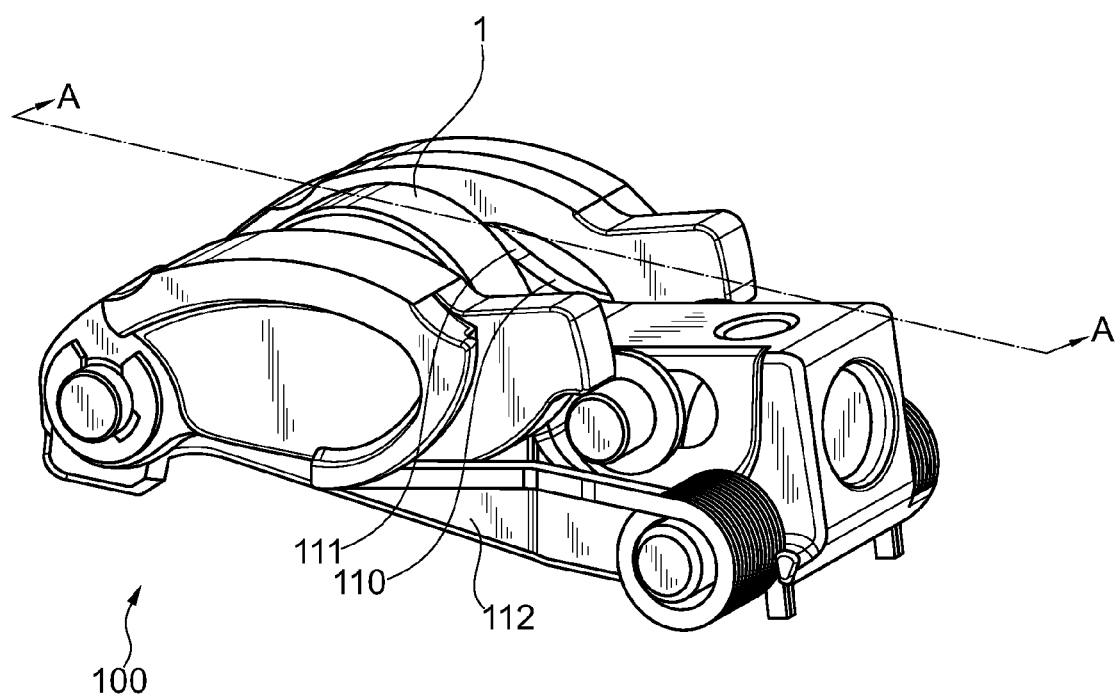
FIG. 1 is a perspective view of a prior art roller finger follower assembly.
Figure 2:
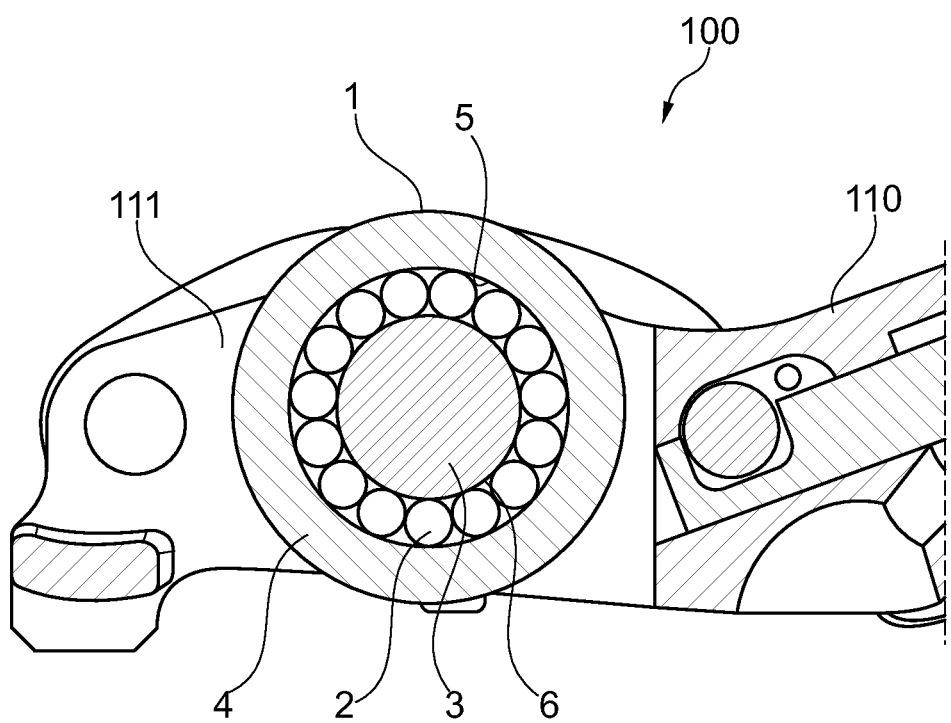
FIG. 2 is a cross sectional view of the prior art roller finger follower of FIG. 1, taken along line A-A.

FIG. 1 is a perspective view of a prior art roller finger follower assembly 100 of a valvetrain of an internal combustion engine. FIG. 2 is a cross sectional view of the prior art roller finger follower 100 of FIG. 1, taken along line A-A. The following description should be viewed in light of FIGS. 1 and 2. Roller finger follower 100 comprises body 110, with two outer sidewalls 111, 112 extending along an axis of follower 100 and forming a space therebetween for assembly of bearing 1. Prior art bearing 1 comprises outer ring 4 and outer raceway 5, inner axle 3 and inner raceway 6, and rolling elements 2, shown as needle rollers, disposed between raceways 5 and 6. Rolling elements 2 abut adjacent rolling elements around an entire circumference of bearing 1. Side walls 111, 112 are formed closely enough to bearing 1 that no additional means of retention of rolling elements 2 within assembly 1 is required, sidewalls 111, 112 retaining rolling elements 2 within bearing 1. It will be understood by one skilled in the art that needle roller bearing 1 may be used in assemblies other than in the roller finger follower assembly 100 shown, where similar retention characteristics are met, such as in balance shafts or hydraulic lifters. Roller finger follower 100 is used for illustrative purposes only.

Figure 3:
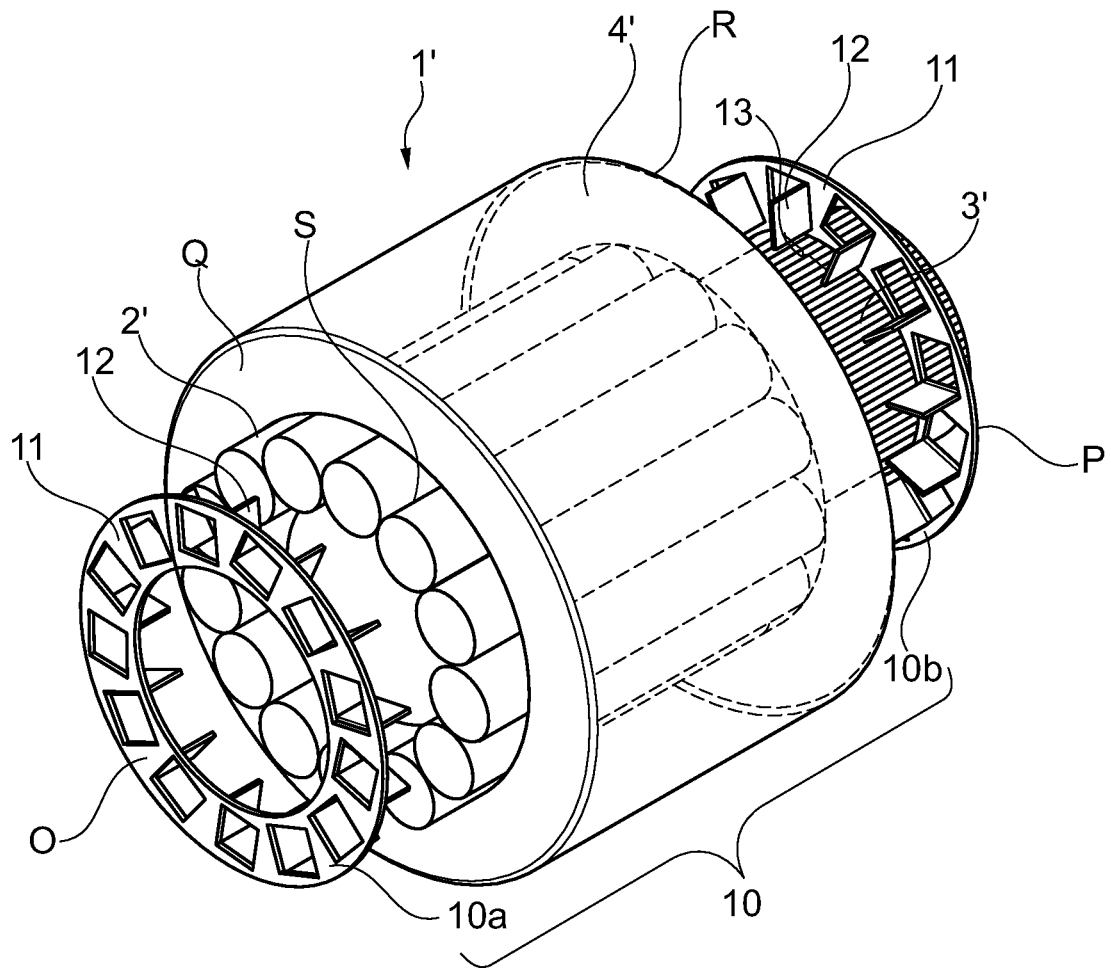
FIG. 3 is an exploded assembly view of the two piece cage and bearing assembly, according to one example embodiment.
Figure 4:
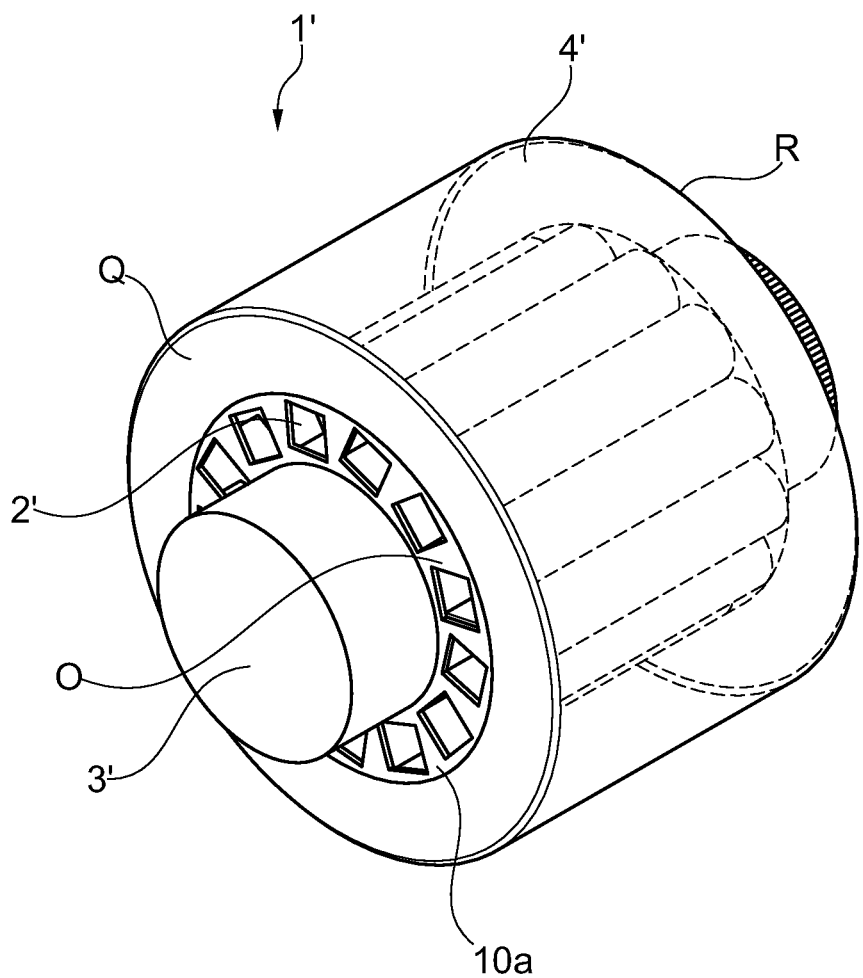
FIG. 4 is a perspective assembly view of the two piece cage and bearing assembly of FIG. 3.
Figure 5:
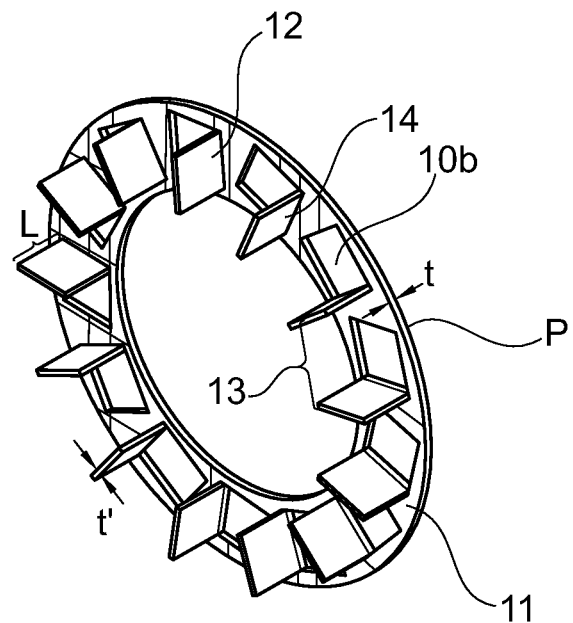
FIG. 5 is a perspective view of the first piece of the two piece cage assembly of FIG. 3.
Figure 6:
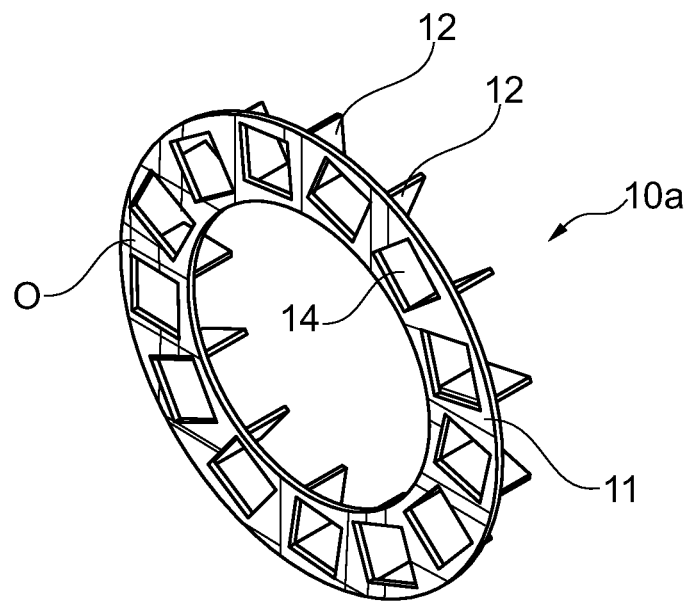
FIG. 6 is a perspective view of the second piece of the two piece cage assembly of FIG. 3.

FIG. 3 is an exploded assembly view of two piece cage 10 and bearing assembly 1', comprising outer ring 4', inner axle or ring 3' and rolling elements 2', according to one example embodiment. Although inner ring 3' is shown as a solid axle, it will be understood by one skilled in the art that ring or axle 3' can also be of a hollow cylindrical form. FIG. 4 is a perspective assembly view of two piece cage 10 and bearing assembly 1' of FIG. 3. FIGS. 5 and 6 are first and second pieces, 10b and 10a, respectively, of two piece cage 10. The following description should be viewed in light of FIGS. 3 to 6.

Two piece cage 10 comprises a first and a second cage or piece, 10a and 10b, substantially identical to each other, but oriented in opposing directions to each other, with projections 12 toward each other, axially inward, within bearing assembly 1'. Each piece or cage comprises a cage body 11, formed in this example embodiment as a disc-shaped circular structure, with an outer diameter less than an outer diameter of outer ring 4' and an inner diameter greater than inner axle 3'. In the example embodiment shown at FIG. 2, the outer diameter of cage 10 corresponds to an inner diameter of outer ring 4' and inner diameter of cage 10 corresponds to an outer diameter of inner axle 3', such that, when projections 12 are inserted into respective gaps S of rolling elements 2', the axially outer surface O and P of cages 10a and 10b with respect to bearing 1' are substantially radially coincident with axially outer surfaces Q and R of outer ring 4'. In other words, cages 10a and 10b can nest within outer ring 4'. Axial projections 12 are formed for each rolling element 2' in a given bearing assembly 1', extending into space or gap S between adjacent rolling elements 2', forming rolling element cage pockets 13 between adjacent projections 12. In the example embodiment shown, cage body 11 is formed of sheet metal, and projections 12 are formed from cage body 11, itself, for example by fine blanking, leaving holes 14, where material was displaced to form projections 12. Projections 12 are flat, thin plate-like structures, joined at a base to cage body 11. The axial length L of projections 12 from cage body 11 are substantially limited by the width of cage pocket 13, and are substantially similar or equal to the diameter of rolling elements 2'. As cage 10 is formed of two pieces, 10a and 10b, placed at opposite axial ends of rolling elements 2', a consistent gap can be maintained between rolling elements 2' with a relatively short length L of projections 12.

In another example embodiment, cage pieces 10a' and 10b' can be formed or molded from plastic or other materials, wherein projections 12' could be integrally formed to body 11', eliminating holes 14 from cage 10. In a further embodiment, lubrication gaps 14' can be formed in cage 10' in order to provide better flow of lubrication oil to rolling elements 2'.

Rolling elements 2' are not actively retained by cage 10, meaning rolling elements are neither snapped into place in cage pockets, nor are the two cage pieces joined to form a retained rolling element/cage assembly. Instead, cage 10 is maintained in position by the surrounding assembly or housing structure, for example sidewalls 111 and 112, of prior art roller finger follower 100. Cages 10a and 10b and rolling elements 2' are otherwise axially dispalaceable within bearing 1'. Cage body 11 must be of sufficient thickness to form projections 12, but also thin enough to fit between rolling elements 2' and the surrounding retention structure of a particular application. In particular, material cage body thickness t can be selected based on both available space between rolling elements 2' to surrounding structures and on space or gap S between adjacent rolling elements 2'. In this embodiment, cage body thickness t would equal material thickness t' of projections 12. It is also contemplated by the present disclosure that cage body thickness t is different from projection thickness t'.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

LIST OF REFERENCE SYMBOLS

1 Bearing Assembly
2 Rolling Elements
3 Inner Axle or Ring
4 Outer Ring
5 Outer Race
6 Inner Race
10 Two Piece Cage Assembly
10a First Cage Piece
10b Second Cage Piece
11 Cage Body
12 Axial Projections
13 Cage Pocket
14 Cage Pocket Hole
100 Roller Finger Follower
110 Roller Finger Follower Body
111 First Sidewall
112 Second Sidewall
1' Bearing Assembly
2' Rolling Elements
3' Inner Axle
4' Outer Ring
L Length of Axial Projections
O Axial Outer Surface of First Cage Piece
P Axial Outer Surface of Second Cage Piece
Q Axial Outer Surface of Outer Ring
R Axial Outer Surface of Outer Ring
S Space of Gap between Rolling Elements
t Thickness of Cage Body
t' Thickness of Axial Projections

What we claim is:
1. A bearing assembly comprising:
an outer ring;
an inner ring;
a plurality of rolling elements disposed between the outer and inner rings;
a cage assembly comprising:
a first cage comprising:

a first cylindrical disc body having a first material thickness;

a first plurality of flat axial projections extending from the first cylindrical disc body in a first axial direction and having the first material thickness;

each of the first plurality of flat axial projections formed from a displaced portion of the first disc body, leaving a first plurality of holes in the first body substantially the same geometry as the first plurality of flat axial projections;

a second cage comprising:

a second cylindrical disc body having a second material thickness;

a second plurality of flat axial projections extending from the second cylindrical disc body in a second axial direction and having the second material thickness;

each of the second plurality of flat axial projections formed from a displaced portion of the second disc body, leaving a second plurality of holes in the second body substantially the same geometry as the second plurality of flat axial projections; and the first plurality of flat axial projections of the first cage and the second plurality of flat axial projections of the second cage oriented towards each other;

the first plurality of flat axial projections of the first cage are disposed between adjacent rolling elements on a first axial end of the rolling elements; and the second plurality of flat axial projections of the second cage disposed between adjacent rolling elements on the second axial end of the rolling elements.

2. The assembly of claim 1, wherein the cage assembly is formed of stamped steel.

3. The assembly of claim 2, wherein the first and the second plurality of axial projections are formed by fine blanking.

4. The assembly of claim 1, wherein the rolling elements and the first and the second cages are not axially fixed relative to the outer ring.

5. The assembly of claim 1, wherein the first and second cages' outer diameter corresponds to an inner diameter of the outer ring, and the first and second cages' inner diameter corresponds to an outer diameter of the inner ring.

6. The assembly of claim 1, wherein the first and the second material thickness is determined by a dimension of gaps between adjacent rolling elements of the plurality of rolling elements.

7. The assembly of claim 1, wherein the first and the second material thickness are equal.

8. The assembly of claim 1, wherein the first and the second material thickness are different.

9. A rolling element cage for a bearing assembly comprising:

a first cage comprising:

a first cylindrical disc body having a first material thickness;

a first plurality of flat axial projections extending from the first cylindrical disc body in a first axial direction and having the first material thickness;

each of the first plurality of flat axial projections formed from a displaced portion of the first disc body, leaving a first plurality of holes in the first body substantially the same geometry as the first plurality of flat axial projections;

a second cage comprising:

a second cylindrical disc body having a second material thickness;

a second plurality of flat axial projections extending from the second cylindrical disc body in a second axial direction and having the second material thickness;

each of the second plurality of flat axial projections formed from a displaced portion of the second disc body, leaving a second plurality of holes in the second body substantially the same geometry as the second plurality of flat axial projections; and the first plurality of flat axial projections of the first cage and the second plurality of flat axial projections of the second cage oriented towards each other; and the first cage and the second cage are arranged to be disposed at opposite axial ends of rolling elements of a bearing.

10. The cage of claim 9, wherein the cage is formed of stamped steel.

11. The cage of claim 9, wherein the first and the second plurality of axial projections are formed by fine blanking.

12. The cage of claim 9, wherein the first and the second material thickness are equal.

13. The cage of claim 9, wherein the first and the second material thickness are different.

* * * * *